(12) United States Patent
Tomita

(10) Patent No.: US 8,593,682 B2
(45) Date of Patent: Nov. 26, 2013

(54) COLOR CONVERSION SYSTEM AND COLOR CONVERSION PROCESSING METHOD

(75) Inventor: Hiroki Tomita, Inashiki-gun (JP)

(73) Assignee: Riso Kagaku Corporation, Tokyo (JP)

(*) Notice: Subject to any disclaimer, the term of this patent is extended or adjusted under 35 U.S.C. 154(b) by 959 days.

(21) Appl. No.: 12/656,678

(22) Filed: Feb. 12, 2010

(65) Prior Publication Data

US 2011/0043834 A1    Feb. 24, 2011

(30) Foreign Application Priority Data

Feb. 13, 2009  (JP) ................................ P2009-031657

(51) Int. Cl.
*H04N 1/60*    (2006.01)

(52) U.S. Cl.
USPC ............................. 358/1.9; 358/518; 358/520

(58) Field of Classification Search
USPC .......................................... 358/1.9, 518, 520
See application file for complete search history.

(56) References Cited

U.S. PATENT DOCUMENTS

| | | | |
|---|---|---|---|
| 8,482,572 B2 * | 7/2013 | Ohnishi | 345/522 |
| 2005/0088698 A1 * | 4/2005 | Matama | 358/2.1 |
| 2007/0285434 A1 * | 12/2007 | Lin et al. | 345/600 |

FOREIGN PATENT DOCUMENTS

| | | |
|---|---|---|
| JP | 05-024406 A | 2/1993 |
| JP | 06-233129 A | 8/1994 |
| JP | 7-46419 A | 2/1995 |
| JP | 11-275377 A | 10/1999 |
| JP | 2000-050091 A | 2/2000 |
| JP | 2002-314827 A | 10/2002 |
| JP | 2005-122612 A | 5/2005 |
| JP | 2006-033656 A | 2/2006 |
| JP | 2006-340105 A | 12/2006 |
| JP | 2008-017528 A | 1/2008 |

* cited by examiner

*Primary Examiner* — Benny Q Tieu
*Assistant Examiner* — Michael Y Tzeng
(74) *Attorney, Agent, or Firm* — Nath, Goldberg & Meyer; Jerald L. Meyer; Scott C. Langford

(57) ABSTRACT

For color conversion of image data in a L*a*b* color space, a color conversion system includes a color conversion processor to implement a first color conversion for color conversion of data positions of an image data in a reference-color representing first region covering a constant hue line at a prescribed hue angle on an a*b* plane, and a second color conversion for color conversion of data positions of the image data in a second region set outside the first region within an angular range smaller in hue angle than the prescribed hue angle on the a*b* plane, the prescribed hue angle being set up in an angular region of 0 degree or more and 90 degree or less relative to an a* axis, the color conversion processor being adapted to implement mutually different color conversion processes for the first color conversion and the second color conversion.

6 Claims, 13 Drawing Sheets

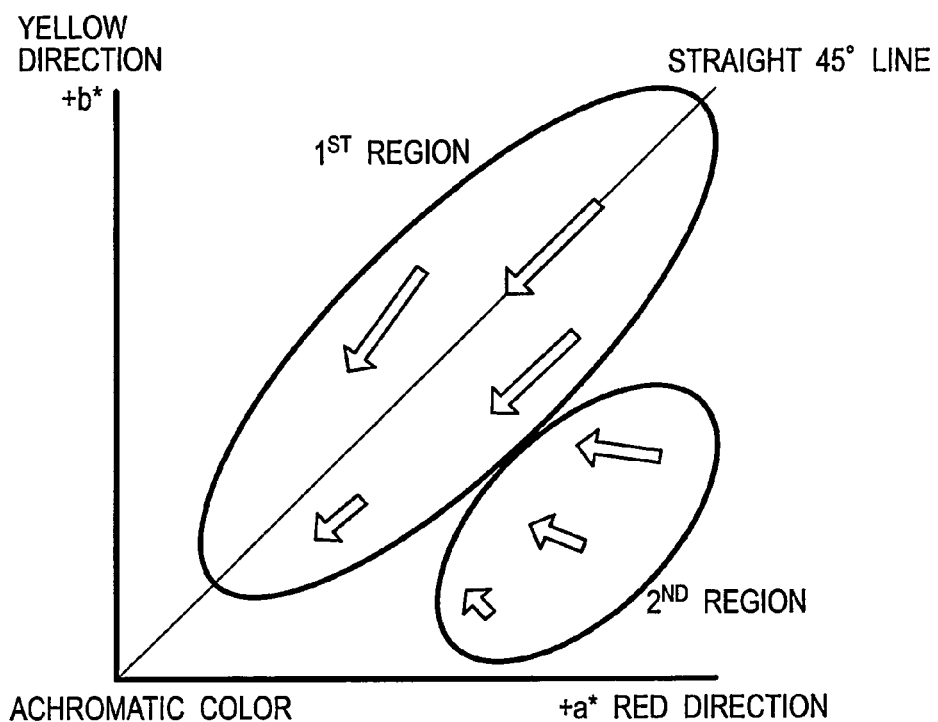

FIG. 10A   LIGHTNESS : 55
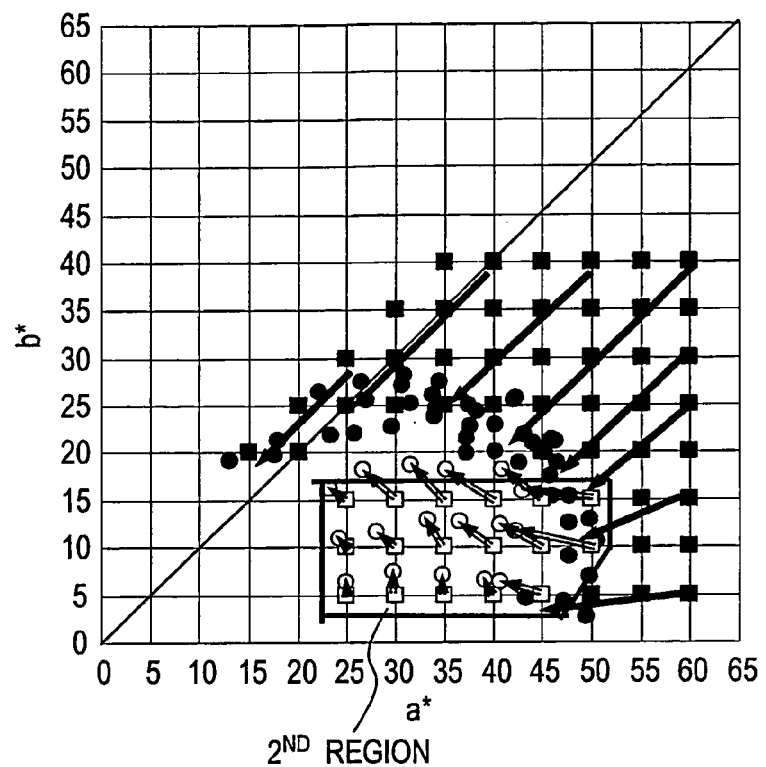
2ND REGION
FIG. 10B   LIGHTNESS : 50
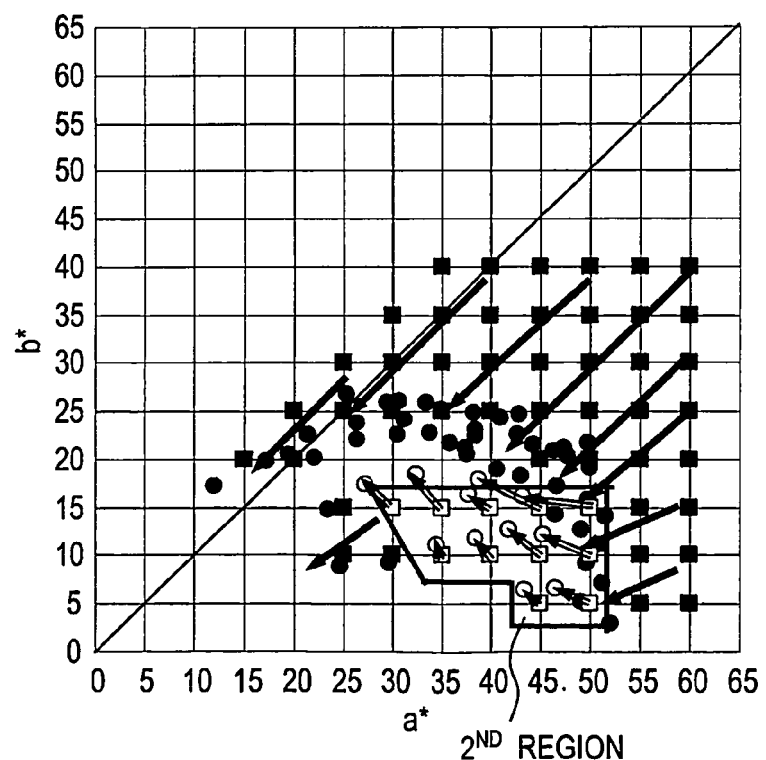
2ND REGION FIG. 11A LIGHTNESS : 60
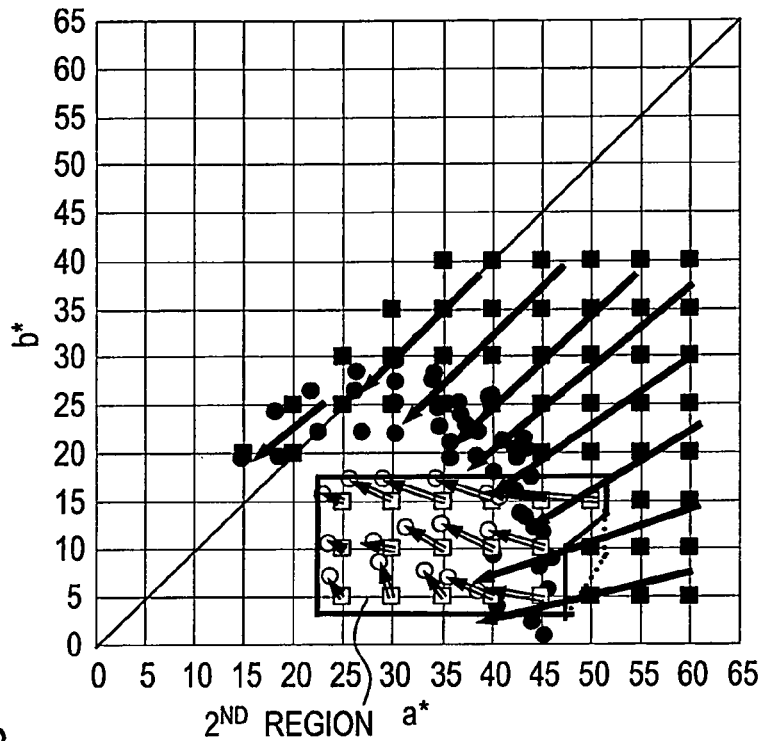
FIG. 11B LIGHTNESS : 65
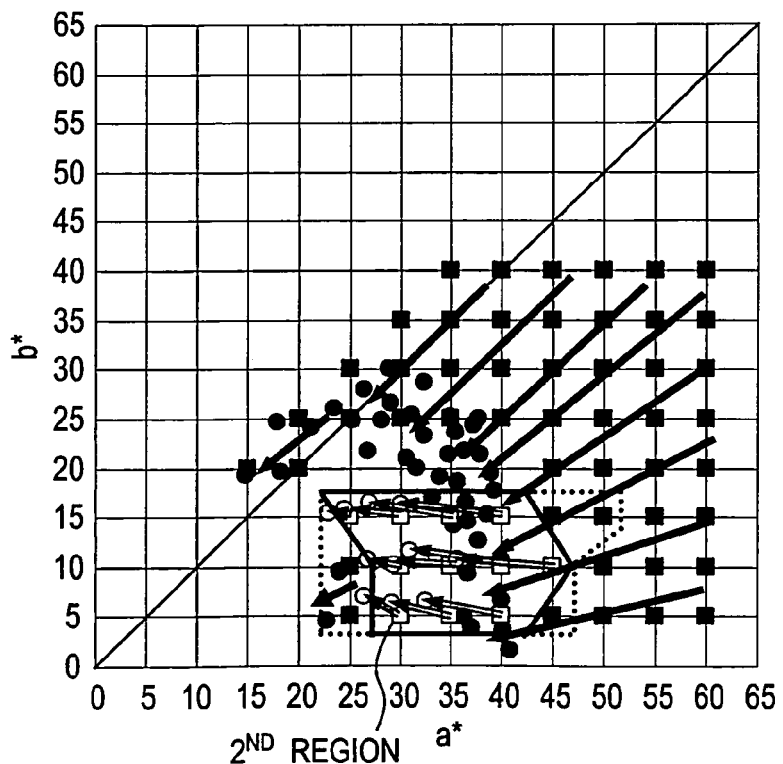

LIGHTNESS : 55

LIGHTNESS : 50

LIGHTNESS : 60

LIGHTNESS : 65

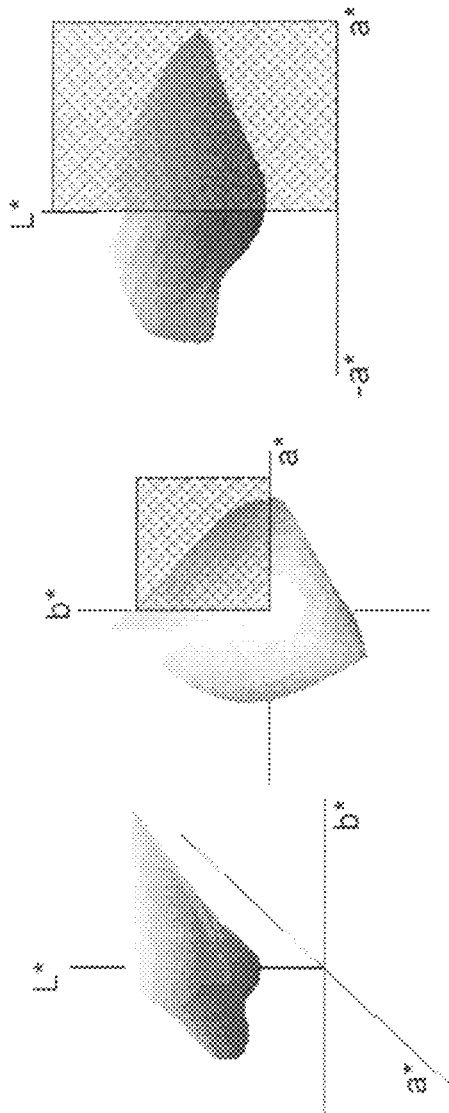

FIG. 15A COLOR REPRODUCTION RANGE: NARROW
(NORMAL SHEET OR SUCH) LIGHTNESS: 55
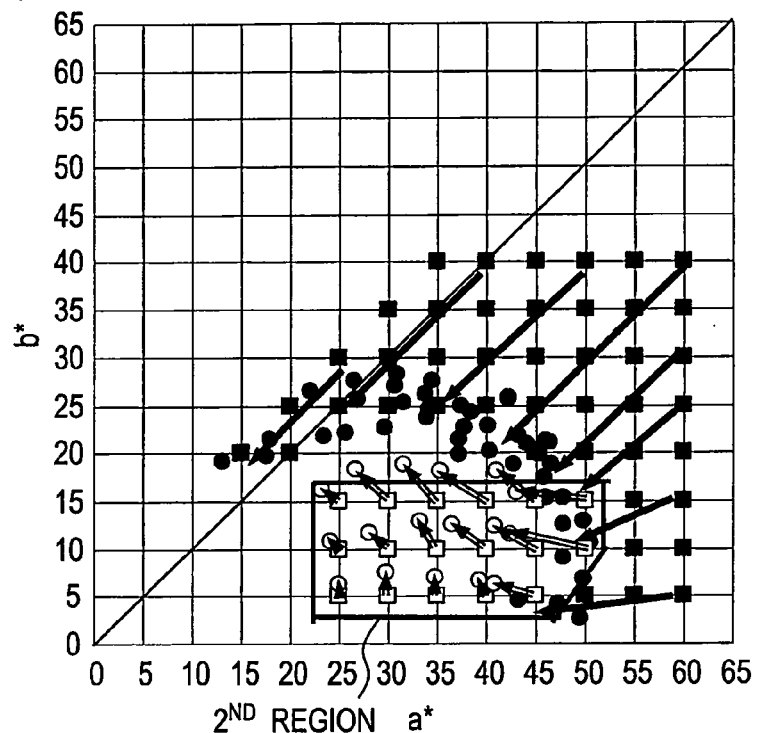
FIG. 15B COLOR REPRODUCTION RANGE: WIDE
(MATTE SHEET OR SUCH) LIGHTNESS: 55
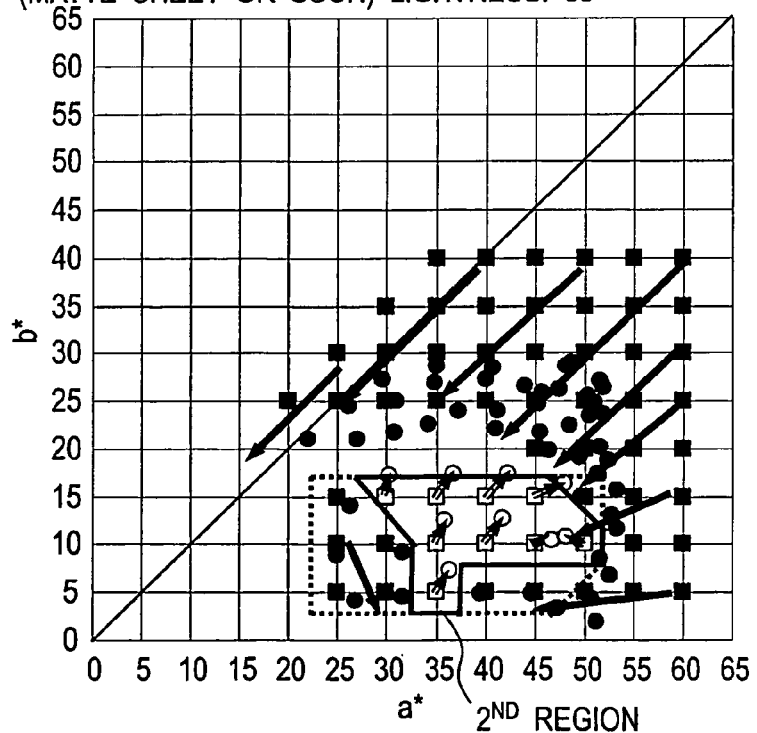

COLOR CONVERSION SYSTEM AND COLOR CONVERSION PROCESSING METHOD

BACKGROUND OF THE INVENTION

1. Field of the Invention

The present invention relates to a color conversion system and a color conversion processing method adapted for color conversion of color images.

2. Description of Related Arts

As a color correction method to obtain a favorable flesh color, Japanese Patent Application Laid-Open Publication No. 7-046419 has disclosed implementing a correction of moving an image data, within a range of flesh colors assumed to be normal, closer to a line of constant hue loci as a center of hues of flesh colors on an a*b* plane in the L*a*b* color space (CIE LAB). Further, Japanese Patent Application Laid-Open Publication No. 2005-122612 has disclosed correcting color coordinates in a substantially elliptical color gamut corresponding to hues of flesh colors on an a*b* plane in the L*a*b* color space, to color coordinates in positions heading to a center point of compression representing a hue and chroma of a target.

SUMMARY OF THE INVENTION

In the L*a*b* color system, normal flesh colors are distributed within a gamut about a constant hue line extending in an intermediate direction at a hue angle of 45 degree between the red (+a*) direction and the yellow (+b*) direction. For photographic images on figure shots, for instance, assuming adequate shooting environment and setting, image data of skin regions have color values assembled within a gamut about a constant hue line at a hue angle of 45 degree, irrespective of race or such. FIG. 1A shows positions of data A and B on an a*b* plane, as exemplary color coordinates of image data of flesh color regions on a shot under adequate shooting environment and setting.

Even in photographic images on figure shots, if the shooting environment or setting is inadequate, image data of skin regions tend to have color values distributed within a gamut at a red-directional side under a constant hue line at a hue angle of 45 degree. Also image data of lip regions tend to have color values distributed within a similar gamut. FIG. 1A shows positions of data C and D on the a*b* plane, as exemplary color coordinates of image data of regions of flesh color or lip color on a shot under inadequate shooting environment or setting.

To represent color images within a range of color reproduction of a device in use, such as a printing machine, required is the color conversion for image data to be compressed within the range of color reproduction. For such situations, there have been available methods of color conversion, encompassing a perceptive (hue retaining) color conversion, a saturation prioritizing color conversion, a relative gamut retaining color conversion, an absolute gamut retaining color conversion, and the like.

Assuming a typical application to image data, for instance, the perceptive color conversion causes data positions to move as illustrated in FIG. 1A. For image data of a shot under adequate environment and setting, it permits data positions A and B of flesh color regions to be color-converted into color coordinates within a gamut about a constant hue line at a 45 degree hue angle corresponding to normal colors, thus allowing for representation of a favorable flesh color. Instead, for image data of a shot under inadequate environment or setting, it provides data positions C and D of flesh color regions with remaining hues even after conversion, thus resulting in a print looking like a skin tinged with red or a lip wearing much lipstick, as an unnatural show. To render more natural color representation of data positions C and D, there may be application of a perceptive color conversion moving the color coordinates closer to a constant hue line at a hue angle of 45 degree as illustrated in FIG. 1B. This may result in a less tinged color of skin subject to a retained unnaturalness with a reduced saturation.

The afore-mentioned patent documents have disclosed color correction methods to obtain a favorable flesh color, without covering considerations of such issues. It is an object of the present invention to provide a color conversion system and a color conversion processing method adapted for color conversion of color images within a device's representation range, allowing for acquisition of a favorable result of color conversion over prescribed colors in color images taken under a variety of conditions.

To achieve the object described, according to a first aspect of the present invention, there is a color conversion system for color conversion of image data in a L*a*b* color space, the color conversion system comprising a color conversion processor configured to implement a first color conversion for color conversion of data positions of an image data in a reference-color representing first region covering a constant hue line at a prescribed hue angle on an a*b* plane, and a second color conversion for color conversion of data positions of the image data in a second region set outside the first region within an angular range smaller in hue angle than the prescribed hue angle on the a*b* plane, the prescribed hue angle being set up in an angular region of 0 degree or more and 90 degree or less relative to an a* axis, the color conversion processor being adapted to implement mutually different color conversion processes for the first color conversion and the second color conversion.

According to a second aspect of the present invention, there is a color conversion processing method for color conversion of image data in a L*a*b* color space, the color conversion processing method comprising implementing a first color conversion process for color conversion of data positions of an image data in a reference-color representing first region covering a constant hue line at a prescribed hue angle on an a*b* plane, and implementing a second color conversion process for color conversion of data positions of the image data in a second region set outside the first region within an angular range smaller in hue angle than the prescribed hue angle on the a*b* plane, the prescribed hue angle being set up in an angular region of 0 degree or more and 90 degree or less relative to an a* axis, the first color conversion process and the second color conversion process being mutually different.

BRIEF DESCRIPTION OF DRAWINGS

FIG. 7 is a plot describing color conversion of color coordinates in a gamut on a first quadrant of a*b* plane.

FIG. 8 is a table listing color conversion methods applicable to a first region, a second region, and other regions.

FIGS. 10A and 10B are plots showing a second region being modified in accordance with lightness.

FIGS. 11A and 11B are plots showing a second region being modified in accordance with lightness.

FIGS. 13A to 13C are stereoscopic maps of a color reproduction range for typical print sheets such as a regular sheet.

FIGS. 15A and 15B are plots of a second region being modified in accordance the type of print sheet.

DETAILED DESCRIPTION OF PREFERRED EMBODIMENTS

Figure 1A:
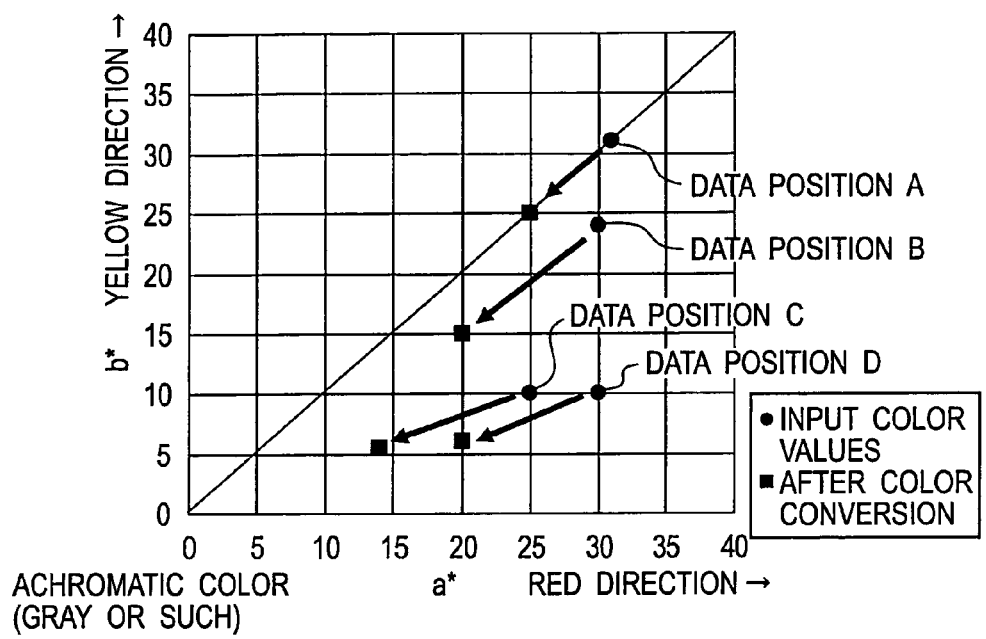
FIGS. 1A and 1B are plots of examples according to color conversion methods in the past.
Figure 1B:
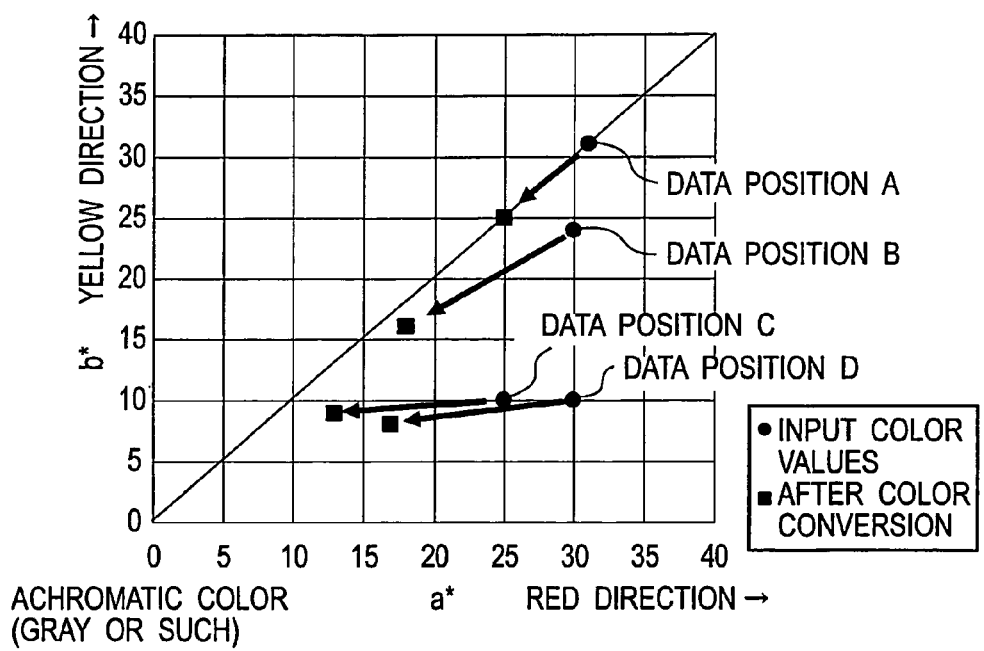
Figure 2:
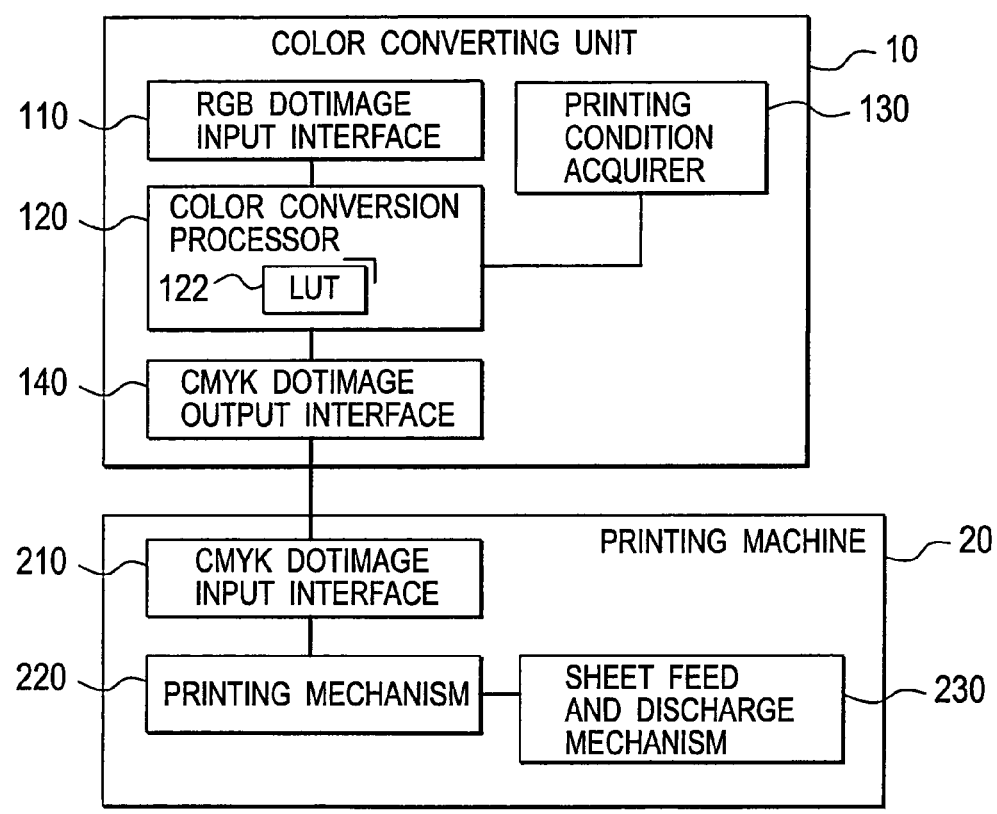
FIG. 2 is a functional block diagram of a system that has a printing machine connected to a color converting unit according to an embodiment of the present invention.

There will be described an embodiment of the present invention with reference to the drawings. FIG. 2 shows a functional block diagram of a system that has a printer 20 connected to a color converting unit 10 according to the present embodiment. As shown in the figure, the color converting unit 10 includes an RGB dotimage input interface 110 configured to input dot image data of an RGB format, a color conversion processor 120 configured to convert image data of the RGB format into image data of a CMYK format, a printing condition acquirer 130 configure to acquire a set of printing conditions set up for the printing machine 20 to work thereon, and a CMYK dotimage output interface 140 configured to output dot image data of the CMYK format.

The RGB dotimage input interface 110 inputs RGB dot image data with colors represented by eight bits each, for instance, from other functional components in the unit or external units. The color conversion processor 120 is provided with a plurality of kinds of lookup tables (LUT) 122, and adapted to look up one or more lookup tables 122 as necessary for conversion of RGB dot image data to CMYK dot image data The lookup tables are each configured as a table to store therein correspondence relations between representative RGB values and CMYK values. As a basis for color conversion, which lookup table to use depends on a set of printing conditions acquired at the printing condition acquirer 130. More specifically, it depends on acquired information of printing conditions such as "whether the printing is color or monochrome", and "which type of print sheet to use".

The printing condition acquirer 130 is adapted for acquisition of a set of printing conditions set up by user. The printing condition set involves, among others, whether color or monochromatic, and which type of print sheet, as described. The printing condition set may be acquired in part. There may be a set of printing conditions received by the printing condition acquirer 130 directly from user, or received from user once by another functional component and acquired therefrom by the printing condition acquirer 130.

The CMYK dotimage output interface 140 is adapted to implement an intermediate graduation process or such of dot image data converted into the CMYK format, to output resultant data to the printing machine 20. The intermediate graduation process may be a process of converting a CMYK dot image with colors represented by eight bits each, into data for representation by a graduation that permits a printing at the printing machine 20.

As shown in the figure, the printing machine 20 includes a CMYK dotimage input interface 210 configured to input dot image data of the CMYK format, a printing mechanism 220, and a sheet feed and discharge mechanism 230 configured for sheet feeding and discharging operations.

In this embodiment, the printing mechanism 220 is configured as an inkjet system including an array of print heads each respectively extending in a direction intersecting with a sheet transfer direction, having a multiplicity of nozzles formed therein, whereby droplets of color and black inks are propelled to implement a printing. It may be configured as another adequate system.

Figure 3A:
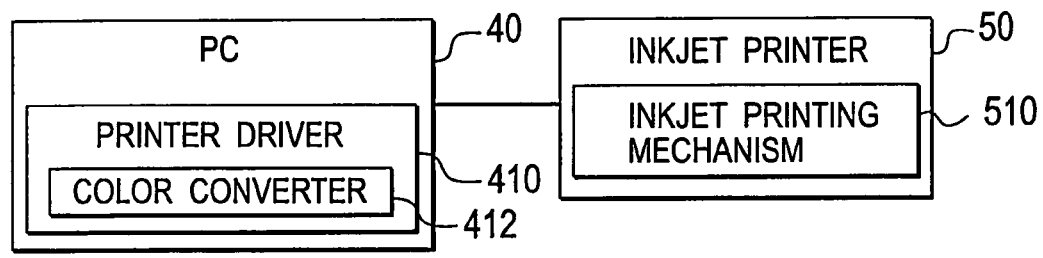
FIGS. 3A and 3B are block diagrams of specific configurations of the system.
Figure 3B:
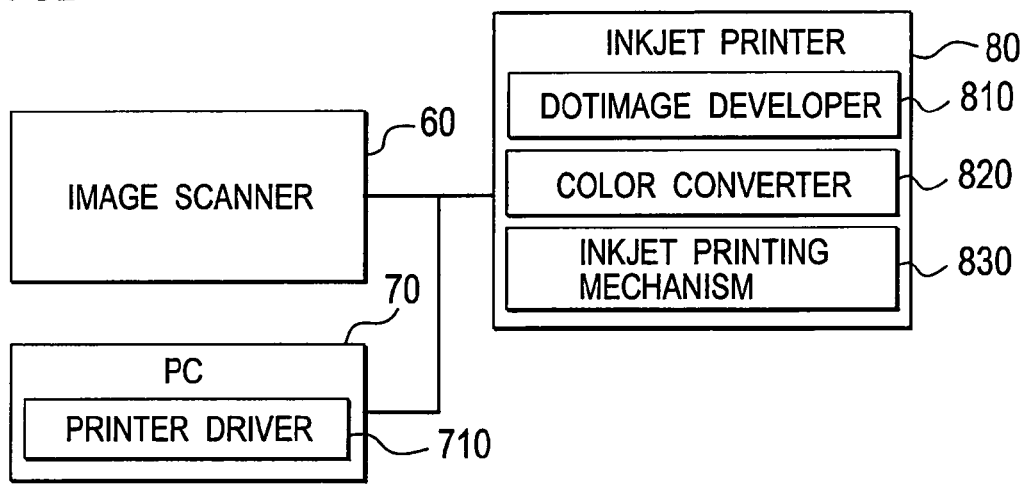

The combination of color converting unit 10 and printing machine 20 shown in FIG. 2 can be implemented with either of specific systems shown in FIGS. 3A and 3B. FIG. 3A shows a system configured with a PC 40 including a printer driver 410, and an inkjet printer 50 including an inkjet printing mechanism 510. In this system, the printer driver 410 is provided with a color converter 412. The PC 40 has image data including, among others, those of RGB format prepared by an application therein, and image data read from a digital camera or such, which are processed at the PC 40 end to develop into dot images, and for a color conversion process into CMYK format, to output to the inkjet printer 50. Along therewith, the PC 40 functions as a color converting unit 10, and the inkjet printer 50 functions as a printing machine 20.

FIG. 3B shows a system configured with an image scanner 60, a PC 70 including a printer driver 710, and an inkjet printer 80 including a dotimage developer 810, a color converter 820, and an inkjet printing mechanism 830. In this system, the image scanner 60 scans an image as a data of RGB format, which is subjected to a color conversion at the color converter 820 of the inkjet printer 80, and output to the inkjet printing mechanism 830 for printing. Or otherwise, at the PC 70, the printer driver 710 outputs a data of page description language, which is input to the inkjet printer 80, where it is developed into a dot image at the dotimage developer 810, and subjected to a color conversion into CMYK format at the color converter 820, to output to the inkjet printing mechanism 830 for printing. In this case, the inkjet printer 80 functions as a color converting unit 10, and as a printing machine 20.

Figure 4A:
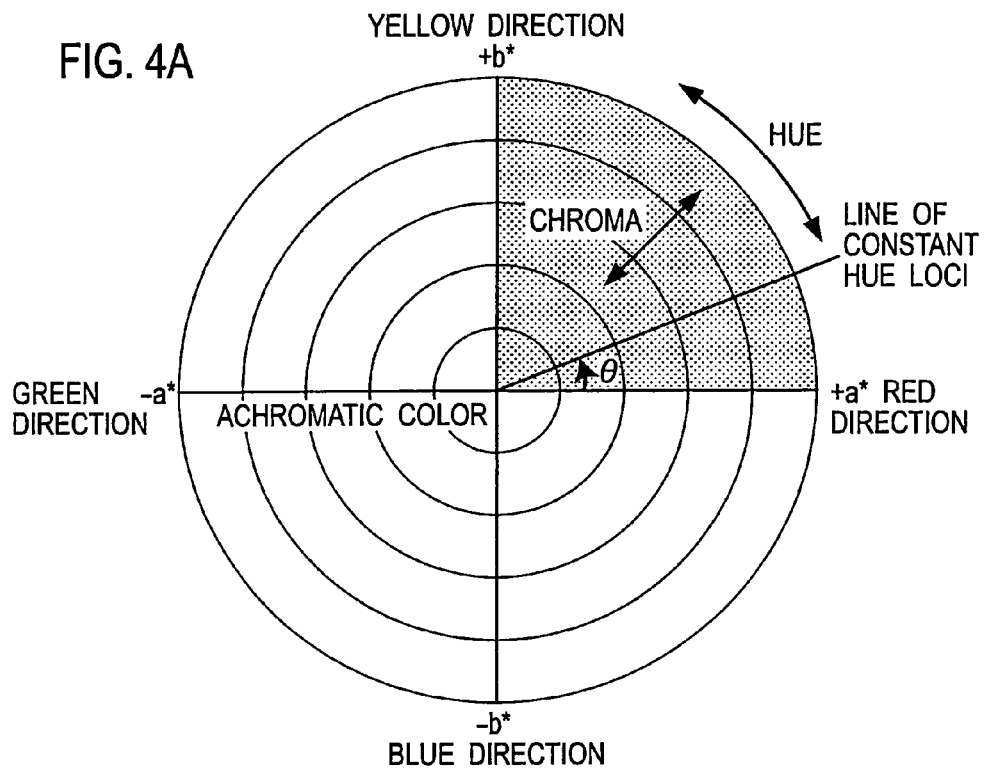
FIGS. 4A and 4B are schematic diagrams describing a color space employed in the embodiment.
Figure 4B:
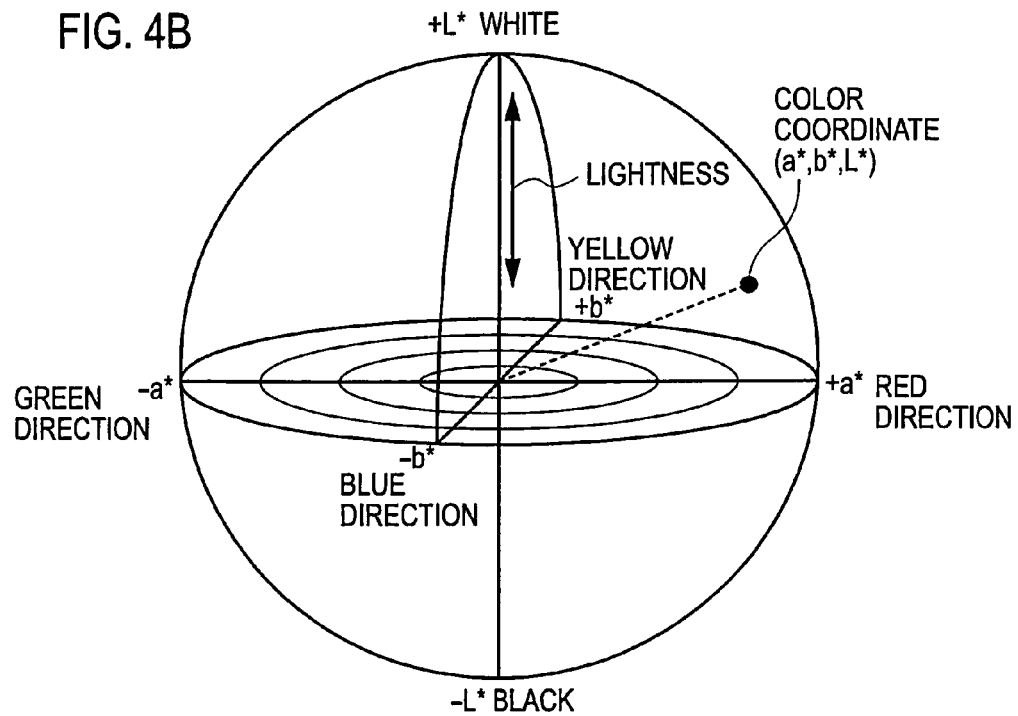

Description is now made of a color space used in this embodiment, with reference to FIGS. 4A and 4B. The present embodiment employs a L*a*b* color system standardized by the CIE (Commission internationale d'éclairage). The L*a*b* color system is defined by an axis of L* representing a lightness, and axes of a* and b* representing a combination of hue and chroma defining a chromaticity. As shown in FIG. 4A, the axis a* and the axis b* represent directions of colors, such that +a* is a direction of red, −a*, a direction of green, +b*, a direction of yellow, and −b*, a direction of blue. Therefore, the hue is represented by a counterclockwise angle θ defined relative to the axis a* on an a*b* plane. This angle θ is referred to as a hue angle. On the a*b* plane, the origin is taken to draw therefrom a half line in the direction of hue angle θ, where colors of a hue reside, and the half line is referred to as a line of constant hue loci. Colors become brighter as they are located further off from the origin, and gets dulled as they come nearer to the origin. That is, distances from the origin indicate saturations of chroma, and the origin is achromatic. FIG. 4B shows a stereoscopic view of the L*a*b* color space with the axis L* inclusive. As shown in FIG. 4, the L*a*b* color space defines any color by an associated color coordinate (a*, b*, L*). This color space covers a space (as a device independent color space) representative by image data, while each printing machine has an actually reproducible color reproduction range (as a device dependent color space), which is narrower. And, it is required to implement a color conversion for compression of color space.

The present embodiment addresses a color conversion in the L*a*b* color space, in particular, with concern to a color conversion of color coordinates in a region shaded in FIG. 4A, that is, within a gamut (as a first quadrant: 0 degree≤θ≤90 degree) between red direction (+a* direction) and yellow direction (+b* direction) on the a*b* plane. This gamut includes flesh colors to be targeted in a distinctive color conversion in the present embodiment.

Figure 5:
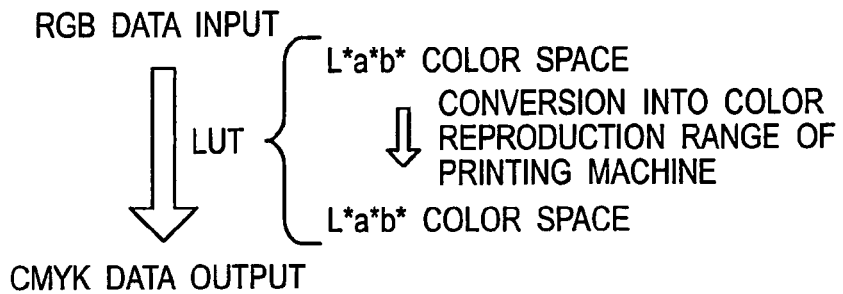
FIG. 5 is a diagram describing a procedure using a LUT (lookup table) for conversion from an RGB format to a CMYK format.

Description is now made of a color conversion process at the color converting unit 10. The color converting unit 10 is adapted for adequate use of lookup tables 122 to convert dot image data of an RGB format into dot image data of a CMYK format, as described. The lookup tables 122 are each prepared as a correspondence table between the RGB color space and the CMYK color space, providing an intervening relation of correspondence from the RGB format to a L*a*b* color system, as shown in FIG. 5. Generally, the printing machine has a narrower color reproduction range than digital cameras or display devices, and needs a setting for color conversion to provide the L*a*b* color system with a compressed gamut. This color conversion is followed by an additional conversion using an intervening relation of correspondence from the L*a*b* color system to the CMYK format, to provide a complete lookup table for conversion from the RGB format to the CMYK format. The color reproduction range varies as the type of print sheet changes, and in general, lookup tables 122 are prepared for respective types of print sheets. The present invention is distinctive in a policy of color conversion in the L*a*b* color system for preparation of lookup tables 122, permitting use of resultant lookup tables 122 for a later-described color conversion process, as an implementation of the policy.

Figure 6:
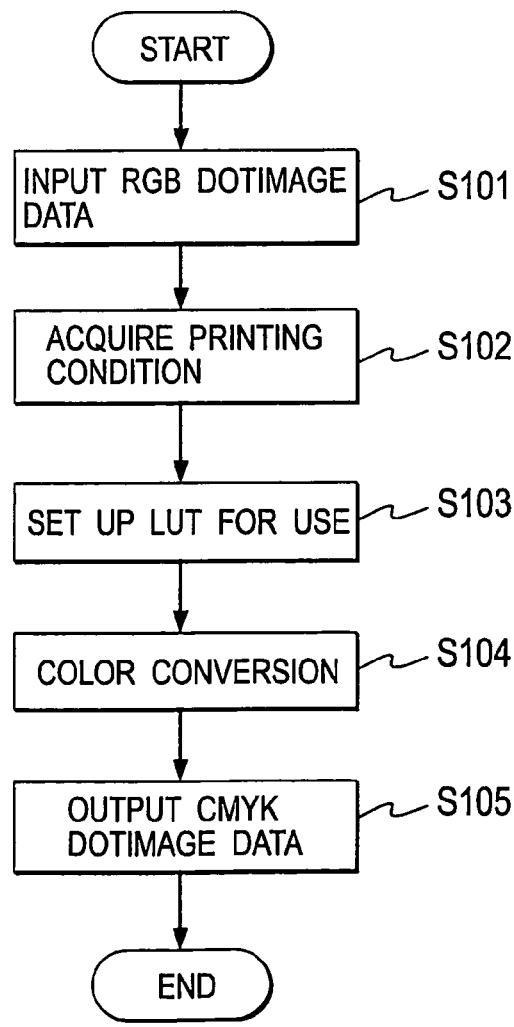
FIG. 6 is a flowchart of control actions of the color converting unit.

The color conversion unit 10 is adapted to implement a color conversion process along a flowchart shown in FIG. 6, for instance. First, at a step S101, the RGB dotimage input interface inputs dot image data of RGB format. The dot image data may be input from outside the color conversion unit 10 or generated inside the color conversion unit 10.

At a step S102, the printing condition acquirer 130 acquires a set of printing conditions set up by user. Then, at a step S103, the color conversion processor 120 sets up a lookup table 122 corresponding to the printing condition set. The lookup table 122 is set up in accordance with a type of print sheet designated as a printing condition. There may be a lookup table 122 set up in compliance with any condition else, such as resolution.

At a step S104, the color conversion processor 120 employs a set lookup table 122 for color conversion from RGB format to CMYK format.

Then, at a step S105, the CMYK dotimage output interface 140 implements processes such as for intermediate gradation of dot image data converted to CMYK format, as necessary to output processed data to the printing machine 20. The printing machine 20 makes a print in accordance with input dot image data, as implementation of a printing process compliant with a color conversion policy according to the present embodiment.

Description is now made of the color conversion policy in the present embodiment, with reference to FIGS. 7 and 8. The present embodiment addresses a color conversion of color coordinates within a gamut, in particular, in the first quadrant on the a*b* plane, as described. FIG. 7 is a plot for description of the color conversion of color coordinates within a gamut in the first quadrant on the a*b* plane.

In the L*a*b* color system, for image data representing standard flesh colors, their data positions are distributed within a gamut about a constant hue line drawn at a hue angle of 45 degree in the first quadrant on the a*b* plane. For photographic images on figure shots, for instance, assuming adequate shooting environment and setting, image data of skin regions have color values assembled within a gamut about the constant hue line at the hue angle 45 degree irrespective of race or such. This embodiment assumes an imaginary rectangular or sectorial planer region defined by a prescribed width or center angle covering the constant hue line at the hue angle 45 degree, and a gamut of an arbitrary geometry inscribed at least in part to a periphery (e.g. at an elongate side) of the imaginary planer region. This gamut is referred herein to as a first region.

On the other hand, even in photographic images on figure shots, if the shooting environment or setting is inadequate, image data of skin regions tend to have color coordinates (in color values) distributed within a gamut at a red-directional side (in the sense of +a*) under the above-noted imaginary planer region. This embodiment assumes on the a*b* plane an angular range of one half (0 degree≤θ≤45 degree) of the first quadrant with respect to the hue angle θ, and in this angular range a gamut of an arbitrary geometry residing outside the first region without having overlap therewith, while having the possibility of contacting with a periphery of the first region at most in part thereof (e.g. on the periphery of the imaginary planer region). This gamut is referred herein to as a second region. In the figure, the first region and the second region have elliptical forms contacting each other on an elongate side of the imaginary planer region, while they may have any forms else.

Referring to a table in FIG. 8, this embodiment applies a first region addressing color conversion to color coordinates residing within the first region, a second region addressing color conversion to color coordinates residing within the second region, and a conventional color conversion to color coordinates residing in other regions.

The first region addressing color conversion may be a conversion (referred herein to as a first color conversion) for compressing color coordinates of data positions of image data in the direction of saturation, with substantially retained hues, as shown in FIG. 7, for instance. This is because, for image data of shots under adequate environment and setting, their color coordinates of data positions representing flesh colors require no changes in hue. More specifically, the first color conversion may be conventionally available methods, encompassing a perceptive (hue retaining) color conversion, a relative gamut retaining color conversion, and the like.

The second region addressing color conversion may be a conversion (referred herein to as a second color conversion) for moving color coordinates of data positions of image data closer to the constant hue line at the hue angle 45 degree, increasing coordinate values in the yellow (+b*) direction, as shown in FIG. 7, for instance. Such the conversion is effective, even on image data of shots under inadequate environment or setting, to make coordinates of data positions of skin regions tinged with red move closer to standard flesh colors, affording to have a favorable result on a print. For image data of skin regions tinged with red, if coordinates of their data positions were compressed in the direction of saturation with retained hues, there might have been a resultant print including skin regions tinged with red or lips looking as if wearing lipstick, giving an unnatural show.

For other regions outside the first and second regions, there may be application of conventionally available color conversion methods, encompassing a perceptive (hue retaining)

color conversion, a relative gamut retaining color conversion, and the like. For the other regions, the method of color conversion applied may well be the same as the first region.

For image data in the second region, the second color conversion directly increases yellow (+b*) coordinate values of their data positions on the a*b* plane, moving their color values closer to the constant hue line at the hue angle 45 degree, which allows for an enhanced representation of flesh colors in a certain internal region, in a more effective manner than use of image data prepared by modifying values of lightness, chroma, and hue in a variety of situation-dependent manners to implement a typical color conversion in the L*a*b* color space. Such the internal region may well be experimentally extracted to store in the color conversion processor 120, for use to set up a second region depending on an associated printing condition set.

Figure 9:
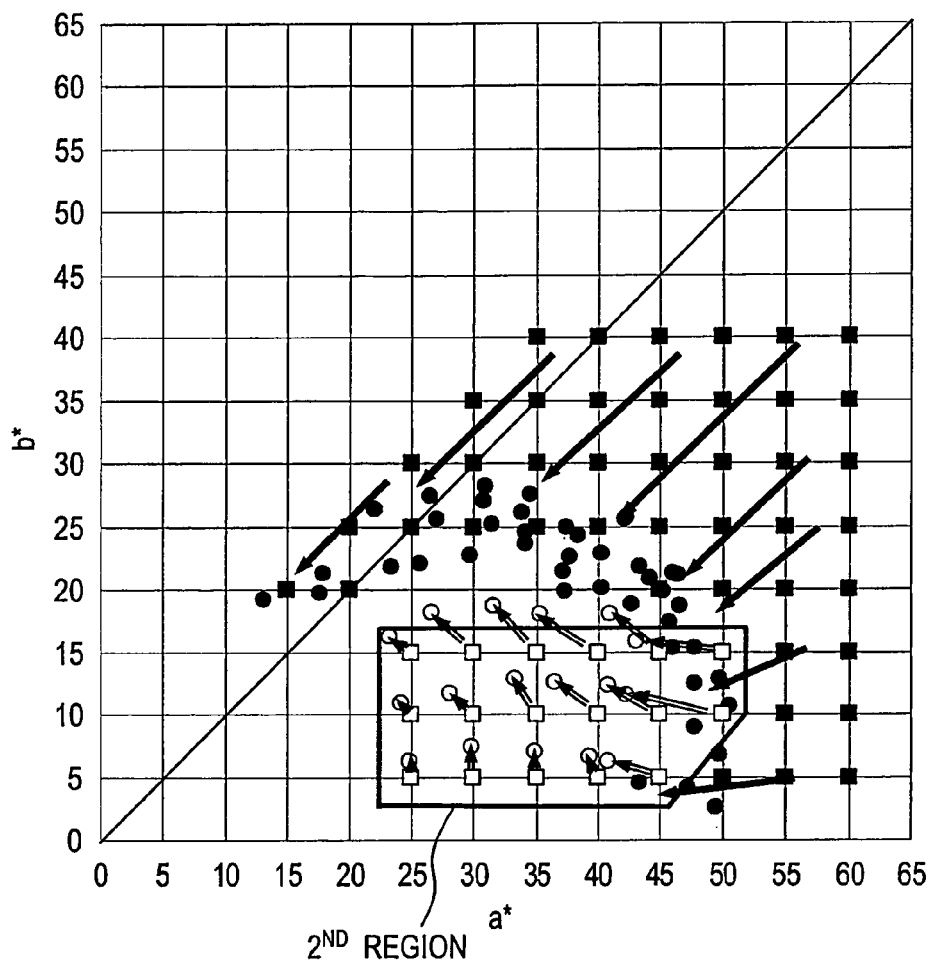
FIG. 9 is a plot describing a specific color conversion according to the embodiment.
Figure 12A:
FIGS. 12A to 12D are diagrams of second regions arrayed by degrees of lightness.
Figure 12B:
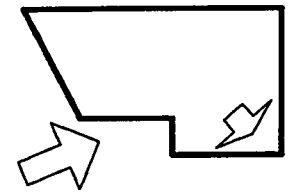
Figure 12C:
Figure 12D:
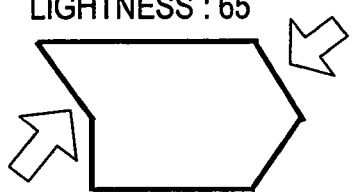

FIG. 9 is a plot of a specific example of color conversion according to the present embodiment. This figure plots a second region defined by a boundary line at a red-directional (+a*) side under the constant hue line at the hue angle 45 degree. Outside the second region, it has a combination of a first region and the other region, where an identical color conversion is employed. That is, there is a color conversion (as the first color conversion) applied to color coordinates in the first region and the other region, for compression thereof with retained hues. In the second region, color coordinates (in color values) are subjected to a color conversion (as the second color conversion) to increase their coordinate values in the yellow (+b*) direction, to move closer to the constant hue line at the hue angle 45 degree, as shown in the figure.

It is noted that in the second color conversion, preferably, color coordinates should be varied in dependence on associated values of lightness (L*). FIG. 10A is a plot of an example with a second region at a lightness of "55", FIG. 10B, a plot of an example with a second region at a lightness of "50", FIG. 11A, a plot of an example with a second region at a lightness of "60", and FIG. 11B, a plot of an example with a second region at a lightness of "65". In FIGS. 11A and 11B, the second regions have their shapes arrayed for comparison at respective lightness values.

FIGS. 12A to 12D show the exemplary second regions respectively. Relative to the second region at the lightness of "55", the second region at the lightness of somewhat darker "50" has a shape narrowed at a local region lower in saturation, and extended at a local region higher in saturation in the red direction. Moreover, relative to the second region at the lightness of "55", the second region at the lightness of somewhat lighter "60" has a shape narrowed at a local region higher in saturation in the red direction. Further, relative to the second region at the lightness of "55", the second region at the lightness of still lighter "65" has a shape narrowed at both local regions lower in saturation and higher in saturation.

Such being the case, the second region has a varied shape depending on the lightness, the reason why follows. FIG. 13A is a stereoscopic view of a space for color representation on a typical print sheet such as a regular sheet. As shown in the figure, such the typical print sheet has a color representation space shaped to be widest at a color representation region extending in parallel with the a*b* plane about a lightness (L*) of "55", and getting narrower as the lightness increases or decreases. Accordingly, relative to the second region at the lightness of "55" widest in area of color representation region, the second region at the lightness of any one of "50", "60", and "65" is set to be narrower.

More specifically, as illustrated in FIG. 13A, along with a changing lightness, the color representation space has a varying area of color representation region, which is accompanied by a variation in shape of this region as a map on the a*b* plane, as well, not simply by a retained similar figure of the region. Accordingly, the above-noted second region also is set to have a varied shape for a favorable print in accordance with a change in lightness. For instance, for a second region to be set, if an associated color representation field is greatly reduced by a change in lightness, the second region should be commensurately reduced at a local region thereof high in saturation. FIG. 13B is a view of the color representation space of FIG. 13A seen in a sense of the L* axis. FIG. 13C is a view of the color representation space of FIG. 13A seen in a direction from −b* end to +b* end perpendicular to the L* axis.

Figure 14B:
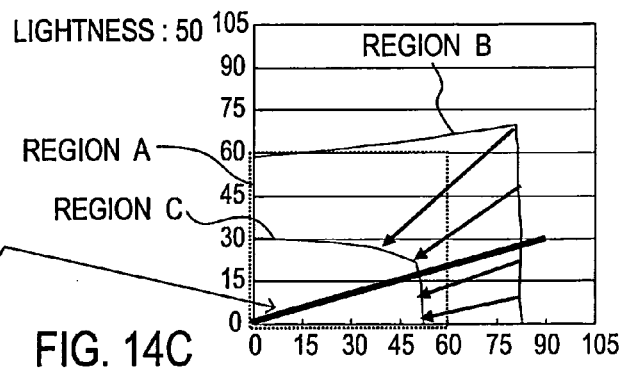
FIGS. 14A to 14E are plots of a*b* plane by degrees of lightness.
Figure 14C:
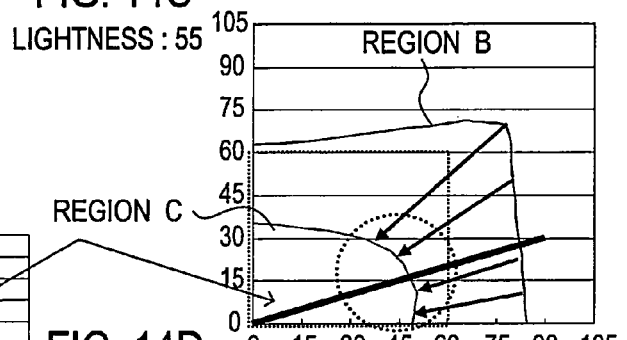
Figure 14A:
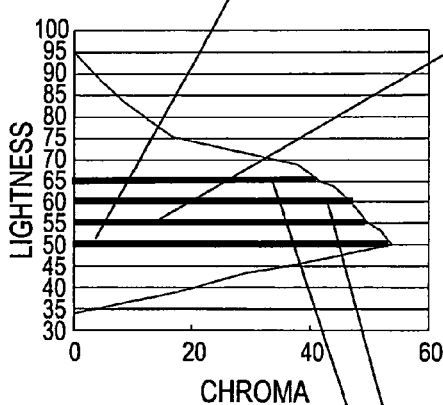
Figure 14D:
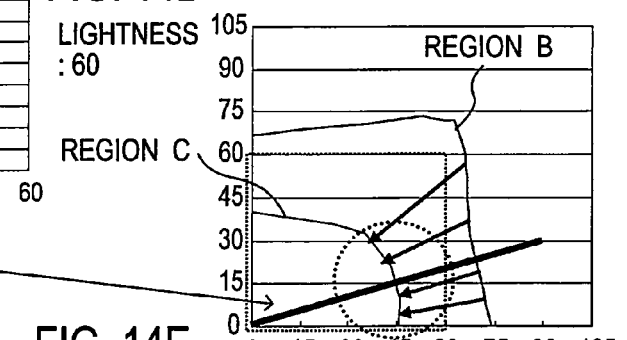
Figure 14E:
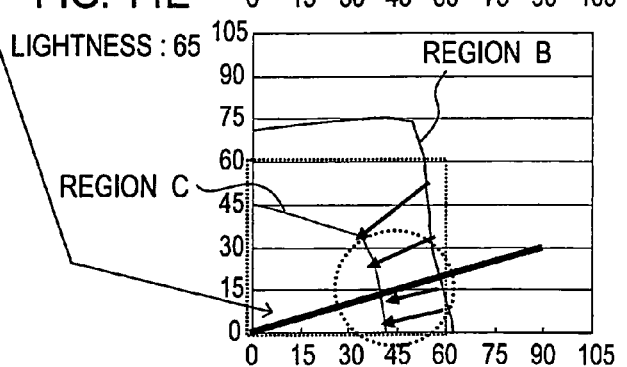

Additional description is now made of examples of variations of color representation region due to changes in lightness, with reference to FIG. 14A to FIG. 14E. FIG. 14A shows several color representation regions sampled at different values of lightness in a section of the color representation space of FIG. 13C along a plane of a hue on a concerned second region on a a*b* plane. The axis of abscissas represents a saturation of chroma defined by a distance from an origin of chromaticity on the a*b* plane. At a certain lightness, an associated second region has a narrowed representation range of saturations within a range of hues, in which for color conversion to be continuous in gradation, preferably, the color conversion by compression of saturation should be given a priority over the manner of moving color coordinates closer to a constant hue line at a hue angle of 45 degree being a set of standard flesh colors. Therefore, the second region is set to have a reduced area.

The reason will be detailed. At a certain lightness, if an associated second region has a narrowed representation range of saturations within a range of hues, then there is a region increased in area outside the color reproduction range, where most of input color values have to undergo a color conversion by compression of saturation. In such the region, if color coordinates are processed to move closer to a constant hue line at a hue angle of 45 degree being a set of standard flesh colors, then post-conversion hues may be little changed or inverted, resulting in an unnatural color reproduction in quality of the image. If color values input with high saturations are bound to an outermost region of color reproduction range (as a region for a color to reproduced with a highest saturation at a hue at a lightness in a printing machine), then the chroma is to be saturated, getting uncooperative.

To avoid such inconveniencies, and in order for a color conversion to be implemented with a continuous gradation in the area-increased region outside the color reproduction range, it is preferable to provide the color conversion by compression of saturation (with a retained hue or compressed saturation, for instance) with a priority over moving color coordinates closer to a constant hue line at a hue angle of 45 degree being a set of standard flesh colors. Accordingly, the second region is set to have a reduced area.

FIG. 14B to FIG. 14E are plots on a*b* planes by values of lightness, each covering a corresponding emphasized hue range of a second region in FIG. 14A. The color reproduction space shown in FIG. 13B is sliced at each concerned value of lightness, obtaining a contour defining a region C in corresponding figure, relative to a region B defining a range of chromaticities input before color conversion. Plotted in FIG. 14B is the case for a lightness of "50", FIG. 14C, for a lightness of "55", FIG. 14D, for a lightness of "60", and FIG. 14E, for a lightness of "65". It is noted that each rectangular region defined by dotted line is a gamut on an a*b* plane according to the present embodiment.

As shown in FIG. 14B to FIG. 14E, the color reproduction range is reduced near the second region, as the lightness increases from the value "55". Therefore, as shown by dotted circular regions FIG. 14C to FIG. 14E, it is preferable to provide the color conversion by compression of saturation with a priority over moving color coordinates closer to a constant hue line at a hue angle of 45 degree being a set of standard flesh colors. Accordingly, the second region is set to have a reduced area.

It is noted that the area of second region may be varied in accordance with the type of print sheet as a recording medium. This is because the color reproduction range is changed wide or narrow in dependence on the type of print sheet. FIG. 15A shows an example of color conversion for use of print sheets, such as a regular sheet, that provide a relatively narrow color reproduction range. FIG. 15B shows an example of color conversion for use of print sheets, such as a matte sheet, that provide a relatively wide color reproduction range. Both figures are plotted for a lightness, e.g., of "55".

As will be seen from the figures, even for an identical lightness, the second region is varied in shape for a favorable result on a print, depending on whether the color reproduction range of print sheet is wide or narrow. More specifically, if the color reproduction range is narrow, the resultant print may be unfavorable in part of a first region near the second region, for a typical color conversion to be implemented with a retained hue. Therefore, in FIG. 15A, the first region is narrowed, and the second region is extended. On the other hand, if the color reproduction range is wide, the resultant print looks natural in a typical color conversion implemented with a retained hue, so it is unnecessary to set the second region wider as the color reproduction range is narrowed. Therefore, in FIG. 15B, the second region is narrowed. Such being the case, the wider the color reproduction range of print sheet is, the narrower the second region can be set.

According to the foregoing description, for data positions in a second region, the color coordinates have their coordinate values increased in the yellow (+b*) direction, moving them closer to a constant hue line at a hue angle of 45 degree. However, there may be consideration of color reproduction range to determine how to move them closer, as follows. That is, the movement may well be described as a sum of a first vector for a color value in the second range to be moved closer to the constant hue line at the hue angle of 45 degree and a second vector representative of a perceptive (hue-retaining) color conversion of the color value in the second range. Here, the first vector may have the direction of a hue angle within a range of 45 degree and 225 degree and have a length determined to have a saturation retained as possible so as not to cause large variations such as those of gradation.

Further, among data positions in the second region, for those data positions residing near hue angles of 0 degree and 45 degree, their color coordinates are given decreased tendencies to move closer to the constant hue line at the hue angle of 45 degree, and for those data positions residing between hue angles of 0 degree and 45 degree, their color coordinates are given increased tendencies to move closer to the constant hue line at the hue angle of 45 degree. This is because of coordinates in boundary regions of the second region that, if changed excessively, may lose consistency with surroundings, providing the gradation with an increased tendency to jump. Therefore, in the second region, macroscopically, color coordinate values in the yellow (+b*) direction are increased to make them move closer to the constant hue line at the hue angle of 45 degree, but microscopically, the data positions are differently moved.

According to the present invention, there is a color conversion system as well as a color conversion processing method configured for color conversion of color images within a device's representation range, allowing for acquisition of a favorable result of color conversion over prescribed colors in color images taken under a variety of conditions.

While the preferred embodiments of the present invention have been described using specified terms, such description is for illustrative purposes, and it is to be understood that changes and variations may be made without departing from the spirit or scope of the following claims.

This application is based upon the Japanese Patent Application No. 2009-031657, filed on Feb. 13, 2009, and the entire content of which is incorporated by reference herein.

What is claimed is:

1. A color conversion system for color conversion of image data in a L*a*b* color space, the color conversion system comprising a color conversion processor configured to implement:
   a first color conversion for color conversion of data positions of an image data in a reference-color representing first region covering a constant hue line at a prescribed hue angle on an a*b* plane; and
   a second color conversion for color conversion of data positions of the image data in a second region set outside the first region within an angular range smaller in hue angle than the prescribed hue angle on the a*b* plane,
   the prescribed hue angle being set up in an angular region of 0 degree or more and 90 degree or less relative to an a* axis,
   the color conversion processor being adapted to implement mutually different color conversion processes for the first color conversion and the second color conversion, wherein
   the prescribed hue angle is set to 45 degree, and
   the second color conversion comprises a color conversion of increasing b* component of a color coordinate of a data position and moving the data position closer to the constant hue line at a hue angle of 45 degree.

2. The color conversion system according claim 1, wherein the first color conversion comprises a color conversion of compressing a chroma of a data position, holding the hue angle.

3. The color conversion system according to claim 1, wherein the second region is varied in shape depending on a lightness of a data position.

4. The color conversion system according to claim 1, wherein the second region is varied in shape depending on a color reproduction range after the second conversion.

5. The color conversion system according to claim 4, wherein the second region has a smaller shape, as the color reproduction range after the second color conversion becomes greater.

6. A color conversion processing method for color conversion of image data in a L*a*b* color space, the color conversion processing method comprising:
   implementing a first color conversion process for color conversion of data positions of an image data in a reference-color representing first region covering a constant hue line at a prescribed hue angle on an a*b* plane; and
   implementing a second color conversion process for color conversion of data positions of the image data in a second region set outside the first region within an angular range smaller in hue angle than the prescribed hue angle on the a*b* plane, the prescribed hue angle being set up in an angular region of 0 degree or more and 90 degree or less relative to an a* axis, the first color conversion process and the second color conversion process being mutually different, wherein the prescribed hue angle is set to 45 degree, and the second color conversion process comprises a color conversion process of increasing b* component of a color coordinate of a data position and moving the data position closer to the constant hue line at a hue angle of 45 degree.

* * * * *

UNITED STATES PATENT AND TRADEMARK OFFICE
CERTIFICATE OF CORRECTION

| | | |
|---|---|---|
| PATENT NO. | : 8,593,682 B2 | Page 1 of 1 |
| APPLICATION NO. | : 12/656678 | |
| DATED | : November 26, 2013 | |
| INVENTOR(S) | : Hiroki Tomita | |

It is certified that error appears in the above-identified patent and that said Letters Patent is hereby corrected as shown below:

In the Claims:

Column 10, Claim 4, Line 51 after "second" and before "conversion"
Please insert --color--

Signed and Sealed this
Eleventh Day of February, 2014

Michelle K. Lee
*Deputy Director of the United States Patent and Trademark Office*